United States Patent

[11] 3,604,622

[72] Inventor Yoshihiko Yamada
2-3-6 Ginza, Chuo ku, Tokyo, Japan

[21] Appl. No. 3,150
[22] Filed Jan. 15, 1970
[45] Patented Sept. 14, 1971
[32] Priority Jan. 22, 1969
[33] Japan
[31] 44/5609

[54] ROENTGENOGRAM-TAKING CONDITION CONVERSION SCALE
3 Claims, 2 Drawing Figs.

[52] U.S. Cl. 235/78, 235/116
[51] Int. Cl. G06c 27/00
[50] Field of Search 235/78, 88, 116

[56] References Cited

UNITED STATES PATENTS

| | | | |
|---|---|---|---|
| 2,235,590 | 3/1941 | Rockwell, Jr. | 88/14 |
| 2,328,881 | 9/1943 | Saunders | 235/78 |
| 3,279,695 | 10/1966 | Krause | 235/78 |

*Primary Examiner*—Stephen J. Tomsky
*Attorney*—Sughrue, Rothwell, Mion, Zinn & Macpeak

ABSTRACT: A condition conversion scale assembly for selecting proper exposure conditions for Roentgenograms is constructed of three coaxial disc scales, one of tube current, one of exposure time, and a third scale of exposure distance and combined together for conversion. By relatively turning the three scales about in common axis, proper conditions for taking a Roentgenogram is selected or converted.

| | PORTION | DIRECTION | TUBE VOLTAGE Kvp | CURRENT mA | TIME sec | TAKING DISTANCE cm | THICKNESS OF THE OBJECT cm | GRID | SENSITIZING PAPER |
|---|---|---|---|---|---|---|---|---|---|
| CHEST | CHEST | P A | 65 | 200 | 0.05 | 150 | 20 | — | F |
| | CHEST | P A | 80 | 200 | 0.04 | 150 | 20 | 5:1 | F |
| | CHEST | P A | 140 | 100 | 0.05 | 150 | 20 | 10:1 | F |
| | APEX OF A LUNG | A P | 65 | 200 | 0.08 | 150 | 20 | — | F |
| | CHEST | Lat | 75 | 200 | 0.1 | 150 | 30 | — | F |
| | CHEST | Lat | 80 | 200 | 0.15 | 150 | 30 | 5:1 | F |
| | CHEST | Lat | 140 | 100 | 0.1 | 150 | 30 | 10:1 | F |
| | | A P | 65 | 50 | 0.8 | 120 | 20 | — | |

ROENTGENOGRAM-TAKING CONDITION CONVERSION SCALE

BACKGROUND OF THE INVENTION

1. Field of the Invention

This invention relates to an exposure condition conversion scale for Roentgenograms, and in particular to an exposure condition conversion scale for selecting proper exposure time and tube current in combination and in accordance with the exposure distance.

2. Description of the Prior Art

In Roentgenogram, there is proper exposure condition for the every portion of the human body in accordance with the X-ray film sensitivity. By the proper conditions, a combination of the tube current (ma.) and exposure time (sec.) is determined for a fixed exposure distance.

In FIG. 2, the combinations of the tube current and exposure time and other parameters for various portions of the human body are shown in a table. By referring the table, the proper conditions can be ascertained, but when using such a table only one set of conditions are provided. In practice, however, one or more of the provided factors or conditions may have to be changed. For example, on account of the limitation of the Roentgen-taking apparatus, the tube current is desired to be different from the one provided by the condition table as shown in FIG. 2, or the exposure distance provided by the table (e.g. 100 cm.) may be desired to change into another (e.g. 150 cm.). In such a case, the combination of exposure conditions must be converted.

In the prior art, a conversion scale for converting a combination of two factors is known and used. For example, a slide-rule-type conversion scale is known, wherein a log scale of tube current (ma.) and another log scale of taking time (sec.) graduated in opposite direction of that of the tube current are slid along each other to get various combinations of the tube current and exposure time which provide a fixed X-ray exposure (X-ray exposure = ma. × sec.). The two scales of the present example of a conversion scale assembly correspond to the CI scale and D scale of the slide rule. When using the type of the conversion scale of the present invention, all possible combinations made when one proper combination is set are valid at the same time to obtain the same exposure. Therefore, selection or conversion is made by employing some combination in the specific combinations or the scale assembly.

In the prior art, however, conversion of conditions among three factors cannot be made. For example, it is not possible to convert the distance in the above example of conversion scale in accordance with the prior art.

SUMMARY OF THE INVENTION

It is desired to provide a conversion scale assembly for converting a third factor by means of a simple construction.

Three disc scales are coaxially combined to rotate about a central holding means. One scale is graduated with a log scale for the tube current, another scale is graduated with a log scale in the opposite direction to that of the first scale for exposure time and the third scale is graduated with a square root of the first log scale for the tube current and in the same direction for exposure distance.

The principal object of the present invention is to provide a conversion scale for selecting a proper combination of conditions for taking X-ray photographs involving these factors.

Another object of the present invention is to provide a conversion scale for selecting a proper combination of conditions for X-ray photographs wherein the exposure distance can be varied for the same X-ray exposure with respect to varying tube currents and/or exposure times.

DESCRIPTION OF THE PREFERRED EMBODIMENT

Figures 1, 2:
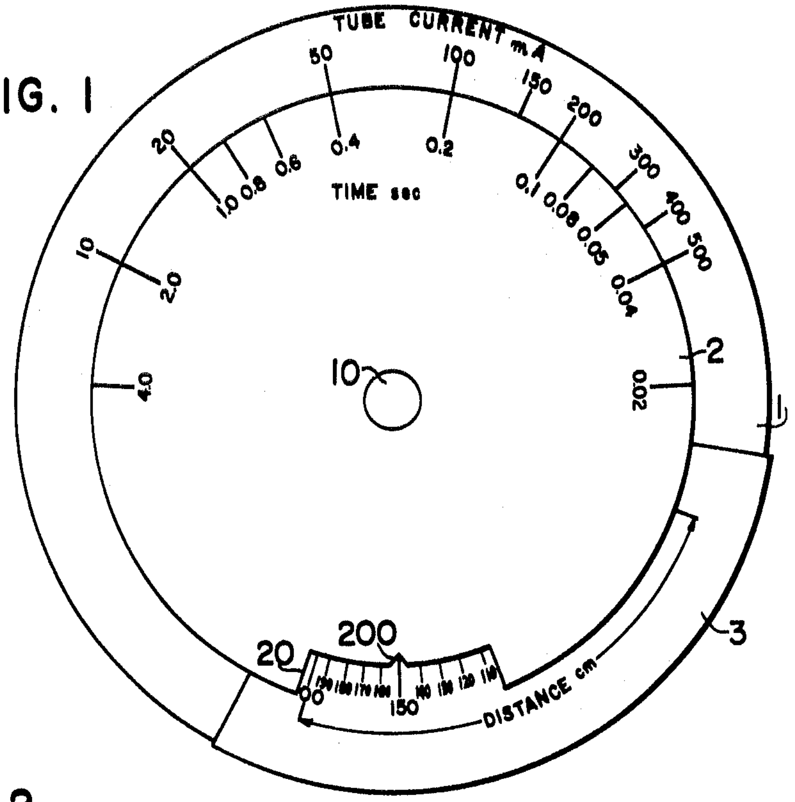
FIG. 1 is a plan view of the conversion scale assembly in accordance with the invention.
FIG. 2 shows a part of a Roentgenogram exposure condition table.

Now referring to FIG. 1, a log scale 1 (D scale) for tube current (ma.) and a log scale 2 (CI scale) for exposure time (sec.) are coaxially mounted on a common pivot 10. The second scale 2 for the exposure time is graduated in the opposite direction to that of the first log scale 1 for the tube current. The two scales 1 and 2 slide along each other about a common axis. On the periphery of the second disc scale 2 is provided a cutout portion 20 which has an indicating notch 200. A fan-shaped third scale 3 is provided coaxially with the first and second scales and is rotatable about the common axis. The third scale 3 is graduated with a square root of the first log scale for the tube current in the same direction. The third scale 3 slides along the cutout portion 20 of the second scale 2 so that the scale can be read at the indicating notch 200 of the cutout portion 20. The third scale 3 provides the exposure distance (in centimeters).

The cutout portion 20 and the indicating notch 200 may not be exactly in the form of a cut or notched portion, but may be just an indication provided on the periphery of the second scale 2.

In operation of the conversion scale constructed as described hereinabove, one proper condition is obtained by the condition table as shown in FIG. 2. (For example, 200 ma., 0.1 sec., 150 cm.). Then the first scale 1 (in milliamperes is set with the second scale 2 (in seconds) to bring the 200 ma. indication into alignment with the 0.1-sec. indication. Other combinations brought into alignment with each other at the same time are all the proper combinations for the same condition, e.g. 100 ma. and 0.2 sec., or 500 ma. and 0.04 sec. Therefore, the operator can select any given combination of the thus obtained combinations. This is the first step in conversion.

Secondly, with keeping the two scales 1 and 2 in the right relation, the third scale 3 is brought into the right position so that the right graduation (150 cm.) is brought into alignment with the notch 200 of the second scale 2 as shown in FIG. 1. Then, by keeping the third scale 3 fixed in relation to the first scale 1, the second scale 2 is turned. In this turn of the second scale 2, various new combinations are obtained according to its new distances. For example, if the second scale 2 is turned to bring the indication 100 cm. into alignment with the notch 200, the combinations newly made between the first and second scales are all the correct combinations for the changed distance of 100 cm. This is the second conversion step.

Thus, the conversion scale assembly in accordance with the present invention performs not only the above-described first conversion step, but also the second conversion step which has never been performed by conventional conversion means. More specifically, not only the proper conversion between the tube current and exposure time is provided, but also the proper further conversion in the exposure distance can be made in accordance with the present invention. Particularly, in Roentgenograms, the exposure distance is often desired to be changed and in this case the other exposure conditions should be converted to get the same exposure. And, the conversion should be made in square relation with respect to the distance variation. Therefore, the conversion responsive to variation in exposure distance is very troublesome and difficult to calculate mentally. From this point of view, it can be said that the present invention provides a very useful and convenient conversion scale assembly.

What is claimed is:

1. An X-ray exposure condition conversion scale assembly comprising:

a first disc having a first log scale in the vicinity of the periphery thereof, a second disc having a second log scale on the periphery thereof, said second disc being coaxially mounted on said first disc and having a smaller diameter than that of said first disc, and a third disc having scale graduations of the square root of said second log scale, said third disc being coaxially mounted with said first and second discs and having a larger diameter than that of said first disc, said first scale comprising exposure time graduations, said second scale comprising tube graduations, and said third scale comprising exposure distance graduations.

2. The X-ray exposure conversion scale assembly as claimed in claim 1 wherein said third disc is a fan-shaped sector, lies intermediate said first and second discs and said second disc includes a cutout peripheral portion to expose the scale of said third disc.

3. An X-ray exposure condition conversion scale assembly comprising:

three discs of varying diameter, a first disc carrying a graduated log scale for tube current a second disc carrying a graduated log scale of exposure time in the opposite direction to that of said one scale and a third disc carrying a graduated scale of the square root of the first log scale for tube current and in the same direction to indicate exposure distance, and means for mounting said discs for rotation about a common axis such that said tube current and exposure time graduations are exposed opposite each other and said exposure distance scale can be varied during rotation of said second disc with respect to the relatively fixed first and third discs.